US007356517B2

(12) United States Patent
Barrows

(10) Patent No.: US 7,356,517 B2
(45) Date of Patent: Apr. 8, 2008

(54) METHOD FOR AUTOMATIC BALANCING OF MAIL PROCESSING ACCOUNTS FOR AN INSERTER SYSTEM

(75) Inventor: Bruce Barrows, Danbury, CT (US)

(73) Assignee: Pitney Bowes Inc., Stamford, CT (US)

(*) Notice: Subject to any disclaimer, the term of this patent is extended or adjusted under 35 U.S.C. 154(b) by 832 days.

(21) Appl. No.: 10/692,568

(22) Filed: Oct. 24, 2003

(65) Prior Publication Data

US 2004/0122781 A1 Jun. 24, 2004

Related U.S. Application Data

(60) Provisional application No. 60/421,275, filed on Oct. 25, 2002.

(51) Int. Cl.
*G06F 17/00* (2006.01)
*G06F 9/00* (2006.01)
*G07B 17/02* (2006.01)

(52) U.S. Cl. ....................................... 705/401; 705/410

(58) Field of Classification Search ................ 705/401, 705/410

See application file for complete search history.

(56) References Cited

U.S. PATENT DOCUMENTS

| | | | | |
|---|---|---|---|---|
| 4,947,333 | A * | 8/1990 | Sansone et al. | 705/403 |
| 5,777,883 | A * | 7/1998 | Lau et al. | 700/220 |
| 6,009,416 | A * | 12/1999 | Pintsov | 705/410 |
| 6,026,385 | A * | 2/2000 | Harvey et al. | 705/408 |
| 6,044,364 | A * | 3/2000 | DeFilippo et al. | 705/404 |
| 2003/0055869 | A1* | 3/2003 | Rosenbaum et al. | 709/201 |
| 2004/0193547 | A1* | 9/2004 | Brookner et al. | 705/60 |

OTHER PUBLICATIONS

Adkins, Tony, "The Business of Mail", Dec. 1993, Office Systems, vol. 10, Iss. 12, pp. 51.*

"Pitney Bowes Introduces the AccuTrac SA Mail Accounting System", Feb. 10, 1998, Buisness Wire, pp. 1.*

* cited by examiner

*Primary Examiner*—John W. Hayes
*Assistant Examiner*—Fadey S Jabr
(74) *Attorney, Agent, or Firm*—Michael J. Cummings; Steven J. Shapiro; Angelo N. Chaclas

(57) ABSTRACT

A method for automatic balancing of mail processing accounts for an inserter system that can automatically account for discrepancies in large quantities of gathered postage data, as well as conserving computer processing work. Mail pieces are formed on an inserter machine including a postage meter. The inserter control system gathers postage setting information and register information from the postage meter while forming mail pieces and provides it to an operating management system. It is understood that the gathered register information is potentially incomplete, out of chronological order, or from multiple sources, thereby creating the need for automatic balancing. The method defines mail piece blocks based on gathered register information and postage setting information. The definition includes assigning individual mail pieces to mail piece blocks based on a comparison of the starting register information for the particular mail piece as a function of the ending register information of a prior mail piece. If the comparison is consistent with processing of a single mail piece, then the particular mail piece is assigned to a same mail piece block as an immediate prior mail piece, and otherwise assigning the particular mail piece to a new mail piece block. Once mail piece blocks are defined, the process identifies gaps between defined mail piece blocks and mail pieces within the gaps. Finally, the mail pieces within the gaps are accounted for, and corrections are made, in accordance with a predetermined algorithm.

16 Claims, 12 Drawing Sheets

METHOD FOR AUTOMATIC BALANCING OF MAIL PROCESSING ACCOUNTS FOR AN INSERTER SYSTEM

This application claims priority under 35 U.S.C. § 119(e) from United States Provisional Application 60/421,275 dated Oct. 25, 2002, titled Automatic Balancing of Meter and Mail Processing Accounting Data, which is hereby incorporated by reference in its entirety.

FIELD OF THE INVENTION

The present invention relates generally to operating management systems for document inserter systems, and more particularly, to operating management systems adapted to remotely monitor and control postage accounts implemented on document inserter systems.

BACKGROUND OF THE INVENTION

Multi-station document inserting systems generally include a plurality of various stations that are configured for specific applications. Typically, such inserting systems, also known as console inserting machines, are manufactured to perform operations customized for a particular customer. Such machines are known in the art and are generally used by organizations, which produce a large volume of mailings where the content of each mail piece may vary.

For instance, inserter systems are used by organizations such as banks, insurance companies and utility companies for producing a large volume of specific mailings where the contents of each mail item are directed to a particular addressee. Additionally, other organizations, such as direct mailers, use inserts for producing a large volume of generic mailings where the contents of each mail item are substantially identical for each addressee. Examples of such inserter systems are the 8 series, 9 series, and APS™ inserter systems available from Pitney Bowes, Inc. of Stamford, Conn.

In many respects the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mailpiece is produced. The exact configuration of each inserter system depends upon the needs of each particular customer or installation.

For example, a typical inserter system includes a plurality of serially arranged stations including at least one postage meter, an envelope feeder, a plurality of insert feeder stations and a burster-folder station. There is a computer generated form or web feeder that feeds continuous form control documents having control coded marks printed thereon to a cutter or burster station for individually separating documents from the web. A control scanner is typically located in the cutting or bursting station for sensing the control marks on the control documents. According to the control marks, these individual documents are accumulated in an accumulating station and then folded in a folding station. Thereafter, the serially arranged insert feeder stations sequentially feed the necessary documents onto a transport deck at each insert station as the control document arrives at the respective station to form a precisely collated stack of documents which is transported to the envelope feeder-insert station where the stack is inserted into the envelope. The finished envelope is then conveyed to a postage station having a postage meter for affixing the appropriate postage to the envelope. A typical modern inserter system also includes a control system to synchronize the operation of the overall inserter system to ensure that the collations are properly assembled.

Typically, an inserter operator employs one or more inserter systems in a common environment (a "shop"). A current trend is to employ an operations management system (OMS) in each shop that is central and connected to each inserter system. More particularly, the OMS connects to the control system of each inserter system so as to monitor the operation of each inserter as well as to control its operation thereof. A system such as that described in U.S. Pat. No. 6,334,119, titled Method and System for Selectively Interacting with a Postage Meter Provided on an Inserter System, may be used to communicate between a plurality of inserter machines each having its own postage meter.

Facilities which use postage meters to apply postage to outgoing mail frequently need to track the amount of postage spent on different mailings. Typically, the postage spent per mailing is charged back to the company or department that created the documents that make up the mail.

In order to obtain the information necessary to do this, a postage accounting system must keep track of the postage spent and relate this to the contents of the envelopes. Postage spent can be obtained from many types of postage meters, which allow automated equipment to read the amount of money in the meter before & after mail is processed. Many kinds of mail processing equipment, such as inserters, can provide information about the contents of the envelopes and the account that should be charged for each mailpiece. A postage accounting system must reconcile the mailpiece information provided by mail processing equipment to the postage charges provided by the meters.

There are many situations, including off-line use of the meter, data loss on the mail processing equipment, etc., that can cause postage and piececount information provided by the mail processing equipment and the meters to disagree with each other. Previously, the two sources of information needed to be reconciled by painstaking manual examination of transaction data, followed by manual entry of corrections. This process is often referred to as "meter balancing".

SUMMARY OF THE INVENTION

The present invention provides a method for automatic balancing of mail processing accounts for an inserter system that can automatically account for discrepancies in large quantities of gathered postage data, as well as conserving computer processing work. In accordance with the invention mail pieces are formed on an inserter machine. The inserter machine includes at least one postage meter for printing postage value on the mail piece envelopes.

The inserter control system gathers register information from the postage meter while forming mail pieces and provides it to an operating management system. The gathered register information preferably includes an ascending register value, a descending register value, and a piece count. It is understood that the gathered register information is potentially incomplete, out of chronological order, or from multiple sources, thereby creating the need for automatic balancing. In addition to register information, postage setting information is gathered for the processed mail pieces.

To assisting in efficient balancing of the gathered data, the invention defines mail piece blocks based on gathered register information and postage setting information. The definition includes assigning individual mail pieces to mail piece blocks based on a comparison of the starting register information for the particular mail piece as a function of the ending register information of a prior mail piece. If the comparison is consistent with processing of a single mail piece, then the particular mail piece is assigned to a same mail piece block as an immediate prior mail piece, and otherwise assigning the particular mail piece to a new mail piece block.

Once mail piece blocks are defined, the process identifies gaps between defined mail piece blocks and mail pieces within the gaps. Finally, the mail pieces within the gaps are accounted for, and corrections are made, in accordance with a predetermined algorithm. By considering only a subset of mail piece blocks proximal to the identified gaps, processing power is conserved, and balancing is achieved dynamically.

The invention is further described in the figures, detailed description, and claims below.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

Figure 1:
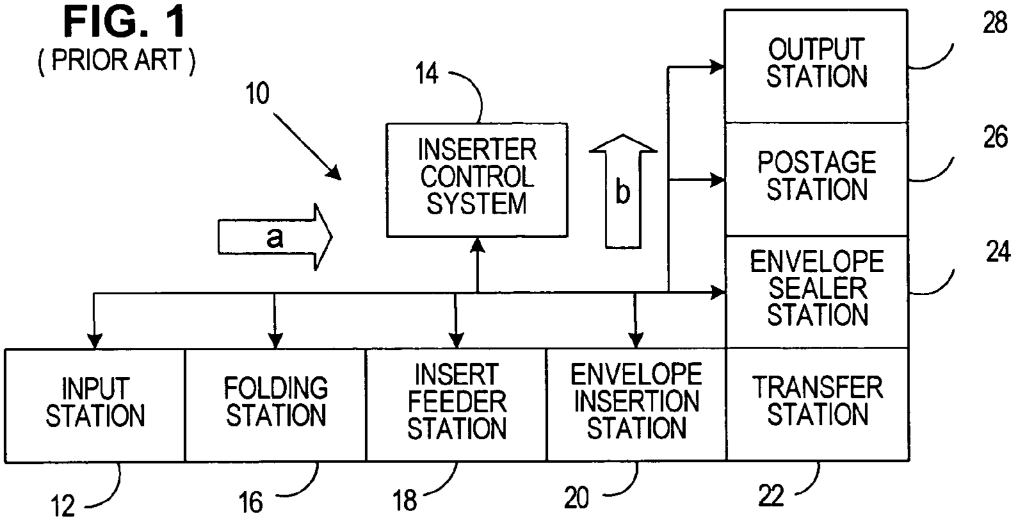
FIG. 1 ( PRIOR ART )
FIG. 1 depicts an inserter system for use with the present invention.

In describing the preferred embodiment of the present invention, reference is made to the drawings, wherein there is seen in FIG. 1 a schematic of a typical document inserting system, generally designated 10, which is coupled to an Operating Management System 100 (hereinafter "OMS") (FIG. 2) embodying the present invention. A brief description of this typical inserting system 10 is given to set forth the operating environment for OMS 100.

In the following description, numerous paper handling stations implemented in a typically prior art inserter system 10 are set forth to provide a brief understanding of a typical inserter system. It is of course apparent to one skilled in the art that the present invention may be practiced without the specific details in regards to each of these paper-handling stations of inserter system 10.

As will be described in greater detail below, document inserter system 10 preferably includes an input station 12 that feeds paper sheets from a paper web to an accumulating station that accumulates the sheets of paper in collation packets. Preferably, at least one sheet, if not all the sheets of a collation are coded (the control document), which coded information enables the control system 14 of inserter system 10 to control the processing of documents in the various stations of the mass mailing inserter system. The code can comprise a bar code, UPC code or the like.

Essentially, input station 12 feeds sheets in a paper path, as indicated by arrow "a," along what is commonly termed the "deck" of inserter system 10. After sheets are accumulated into collations by input station 12, the collations are folded in folding station 16 and the folded collations are then conveyed to a insert feeder station 18. It is to be appreciated that a typical inserter system 10 includes a plurality of feeder stations, but for clarity of illustration only a single insert feeder 18 is shown.

Insert feeder station 18 is operational to convey an insert (e.g., an advertisement) from a supply tray to the main deck of inserter system 10 to be nested with the aforesaid sheet collation conveying along the main deck. The sheet collation, along with the nested insert(s), are next conveyed to an envelope insertion station 20 that is operative to insert the collation into an open envelope. Afterwards, the stuffed envelope is then preferably conveyed to a transfer module station 22.

The transfer module 22 changes the direction of motion of flat articles (e.g., envelopes) from a first path (as indicated by arrow "a") to a second path (as indicated by arrow "b"). In other words, transfer module 22 takes a stuffed envelope from the envelope insertion station 20 and changes its direction of travel by ninety degrees (90°). Hence, transfer module 10 is commonly referred to in the art as a "right-angle transfer module" or a "take-away transfer module."

After the envelope changes its travel direction, via transfer module 10, it is then preferably conveyed to an envelope sealer station 24 for sealing. After the envelope is sealed, it is then conveyed to a postage station 26 having at least one postage meter for affixing appropriate postage to the envelope. Finally, the envelope is preferably conveyed to an output station 28 that collects the envelopes for postal distribution.

It is noted that the postage station preferably includes a weighing station upstream from the postage meter for weighing the envelope prior to its arrival at the postage meter so as to determine the appropriate postage to be affixed to the envelope. An example of such postage stations implemented on an inserter system can be found in commonly assigned U.S. Pat. No. 4,817,042, which is hereby incorporated by reference in its entirety.

As previously mentioned, inserter system 10 also includes a control system 14 preferably coupled to each modular station of inserter system 10, which control system 14 controls and harmonizes operation of the various modular stations implemented in inserter system 10. As an example of such a control system can be found in commonly assigned U.S. Pat. Nos.: 3,935,429; 4,527,791; 4,568,072; 5,345,547; 5,448,490 and 5,027,279, which are all hereby incorporated by reference in their entirety. Preferably, control system 14 uses an Optical Marking Reader (OMR) for reading the code from each coded document.

It is to be appreciated that the depicted embodiment of a typically prior art inserter system 10 is only to be understood as an exemplary configuration of such an inserter system. It is of course to be understood that such an inserter system may have many other configurations in accordance with a user's specific requirements.

Figure 2:
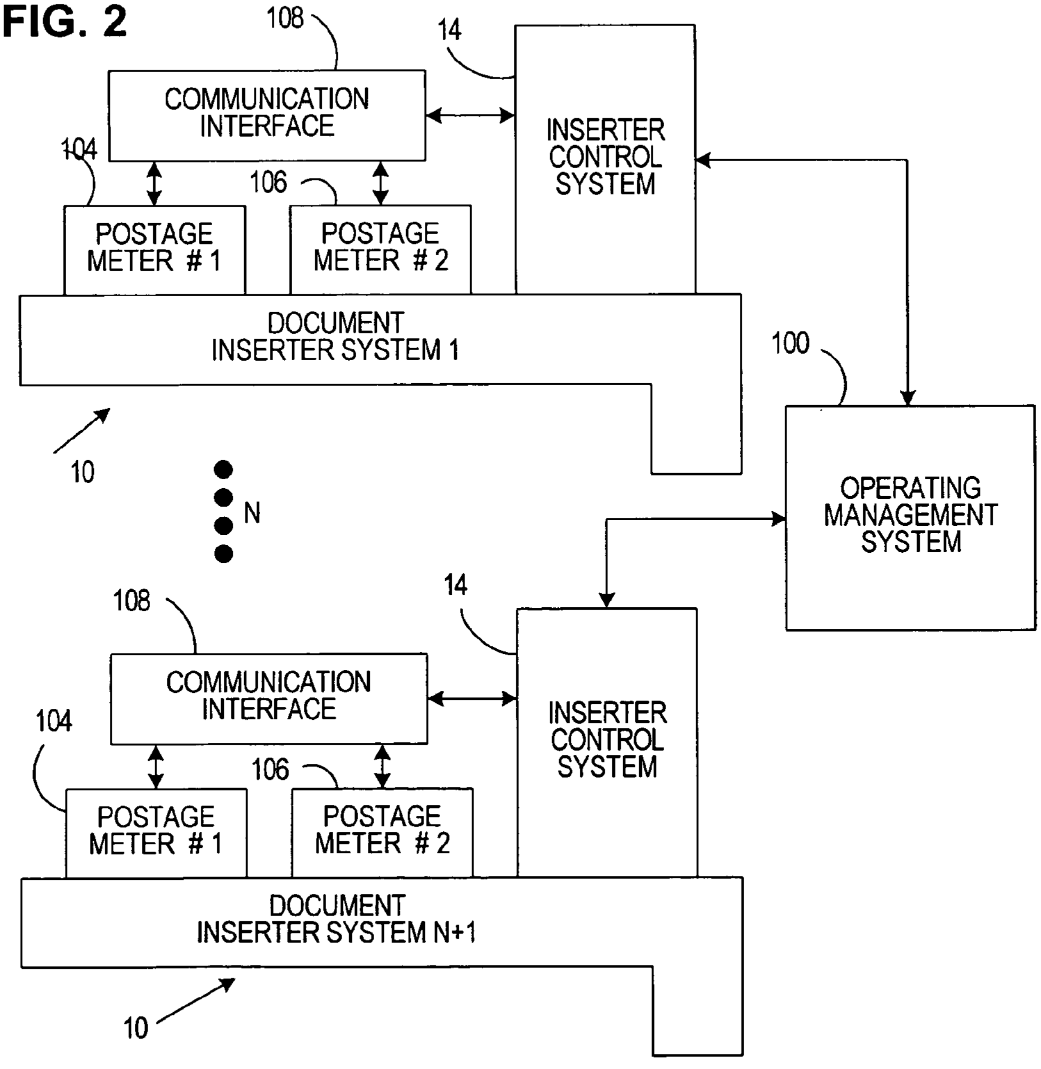
FIG. 2 depicts a group of inserter systems managed by an operating management system.

With reference to FIG. 2, an OMS 100 is depicted coupled to a plurality (N+1) of inserter systems 10. For ease of description, each inserter system 10 it to be understood to be commonly configured. Of course it is to be appreciated that each inserter system 10 coupled to OMS 100 may differ in configuration from each other and may further employ differing Inserter Control Systems 14. Further, it is to be appreciated that OMS 100 is not to be understood to be restricted to be coupled to a plurality of inserter systems 10 but rather may be coupled to only a single inserter system 10.

It is to be appreciated that in order for the inserter control system 14 to communicate with each postage meter 104 and 106, each inserter system 10 is preferably provided with communications interface box 108 that is coupled to each postage meter 104 and 106, and to the inserter control system 14 on each inserter system 10. Preferably communications interface box 108 is a Pitney Bowes echoplex communication protocol device which allows postage meters to communicate using an encrypted type messaging scheme for confidentiality from external sources.

The present invention is preferably used as a component of a larger system for monitoring and controlling document production equipment. A preferred example of such a larger system is described in U.S. patent application Ser. No. 10/280,339, titled Document Lifecycle Tracking System and method for Use With a Document Production Process, filed Oct. 25, 2002, and which is hereby incorporated by reference.

The OMS 100 automatic account balancing feature compares the postage and piececount information provided by postage meters 104, 106 to similar information provided by control system 14. The comparison is made in real-time, and the data may be received in any order. Discrepancies are automatically detected and corrections are made automatically which attempt to charge the discrepancies to the correct account. An operator may later correct these choices if necessary.

In order to collect the information required for automatic account balancing, some important decisions were made about what the control system 14 should communicate to OMS 100. Control system 14 performs the following steps to support the account balancing activities of OMS 100.

Control system 14 periodically reads the registers in attached meters to determine their current values. Registers report total postage used ("ascending register"), funds remaining in the meter ("descending register"), and total pieces stamped ("piececount register"). These meter register reads typically occur when the control system 14 is stopped, but may in some circumstances occur when it is running.

Control system 14 keeps track of the postage setting currently used on each meter, if this information is not communicated by the meter when it prints an indicia.

Control system 14 listens for "trip messages" from attached meters, which are sent when an indicia is printed, then infer the new values of each meter's registers based on the previous values and the current meter postage setting (which may or may not be provided with the trip message).

For each mailpiece, control system 14 outputs a record to OMS 100 which shows all information about the mailpiece that is significant for postage accounting (account, type of job, meter serial number, name of mail processing equipment & operator, mailpiece identification, etc.), along with the (computed) values of the meter registers after the indicia was printed on that mailpiece and the postage applied. Three types of information must be acquired by OMS 100 for each mailpiece: the initial register values, the final register values, and the postage applied. Since final−initial=postage applied, only two of these need to be reported and the third can be calculated. In the preferred embodiment, OMS 100 collects the final register values and the postage, but any other two of the three types of information would also suffice and would have no significant impact on the rest of the balancing algorithm.

With the final ascending, descending, and piececount registers available for each mailpiece, as well as the postage applied, OMS 100 can compute the initial ascending, descending, and piececount registers values. For convenience, the following notation will be used for the remainder of this application:

$start\_asc_N$=Initial (start) ascending register value for mailpiece N.

$start\_desc_N$=Initial (start) descending register value for mailpiece N.

$start\_count_N$=Initial (start) piececount register value for mailpiece N.

$end\_asc_N$=Final (end) ascending register value for mailpiece N.

$end\_desc_N$=Final (end) descending register value for mailpiece N.

$end\_count_N$=Final (end) piececount register value for mailpiece N.

Note that to determine N, the pieces must be sorted into the order in which they passed through the meter. This may not necessarily equal the order in which they exit the mail processing equipment, so OMS 100 must sort by ascending, descending, and piececount registers to get the mailpieces into the proper order.

The initial values for any mailpiece should equal the final (post-indicia) values for the previous mailpiece. Otherwise, the meter must have performed some action without the knowledge of the control system 14. Potential scenarios for discrepancies are as follows.

If $end\_asc_{N-1}<start\_asc_N$, then some postage has been used between the processing of the two mailpieces. This can occur if the meter was disconnected from the control system 14 and used "off-line", or if the control system 14 lost track of one or more "trip" messages. This is referred to as a discrepancy condition.

If $end\_asc_{N-1}=start\_asc_N$, but $end\_desc_{N-1}<start\_desc_N$, additional funds have been added to the meter.

If $end\_asc_{N-1}=start\_asc_N$ and $end\_desc_{N-1}=start\_desc_N$, but $end\_count_{N-}<start\_Count_N$, then some indicias were generated with 0 postage between mailpieces (N−1) and N. This is also referred to as a discrepancy condition.

The above represent the possible cases if all of the subsystems are functioning properly. However, other conditions are possible: If $end\_asc_{N-1}>start\_asc_N$, then there is an error in the data provided by the control system 14. This condition, referred to as an overlap condition, essentially means that the same postage was used more than once, which is not possible (short of a malfunction in the meter itself). Nevertheless, in practice this condition is occasionally observed, and usually results from some problem in communication between the meter and control system 14 or between control system 14 and OMS 100. So, OMS 100 must be able to handle this condition.

Similar conditions are also possible, in which the descending and/or piececount registers change in unexpected ways. OMS 100 must be able to handle all of these conditions in such a way that if the first mailpiece OMS 100 observes being processed by the meter is mailpiece 1, and the last mailpiece processed is Z, then:

$end\_asc_Z - start\_asc_1$ = Sum of postage in all OMS 100-recorded transactions;

$end\_desc_Z - start\_desc_1$ = Sum of all meter funds adds minus sum of postage used in all OMS 100-recorded transactions;

$end\_count_Z - start\_count_1$ = Total number of pieces in all OMS 100-recorded transactions.

Toward this end, OMS 100 adds, when necessary, transaction records to the mailpiece information provided by the control system 14 in order that the above relationships will always be true. Also, OMS 100 allows appropriate account, machine, job type, operator, and other classifications to be assigned to these transactions so that postage is accounted for correctly.

The complete record of all activity on a meter, including what is reported by the control system 14 as well as what is inferred by OMS 100, is referred to as the meter history. At any time, OMS 100 could review the entire meter history for each meter, inserting correcting transactions where necessary.

However, this straightforward approach has some limitations. It is difficult to determine when to perform this processing. Certainly, it can't be done every time a report is requested by the user, as this would be much too slow. If it is done on a periodic basis, then there is a trade-off: If it is performed too often, performance is adversely affected. If it is not performed often enough, there will be periods of time during which the meter history will appear to be out of balance. Neither of these options is acceptable.

Another limitation is that working at the mailpiece level involves too much computation. A typical mailroom may process hundreds of millions of mailpieces over a year's time, a typical amount of history that OMS 100 should be able to report on. Going through this volume of data to check for discrepancies, funds adds, and overlaps would be extremely time-consuming.

An additional complication is that mailpiece data may not be received in order, particularly if postage meters are moved around the mailroom from one piece of mail processing equipment to another. In a typical environment, OMS 100 collects data from control system 14 via network. If the network connection to one machine is not functioning for a time, and a meter is moved from that machine to another where the network connection is functioning (and thus where data are being reported to OMS 100), then OMS 100 may at first detect a discrepancy in that meter's history. Later, when data are received from the machine with the bad network connection, this discrepancy will be filled in, and OMS 100 must be able to remove the discrepancy correction that it previously added.

Accordingly, in the preferred embodiment OMS 100 automatic balancing works with groups of mailpieces, rather than individual ones. Further, OMS 100 automatic balancing occurs dynamically, reviewing only those parts of the history of a given meter that have changed. This allows all meters to remain balanced at all times.

The first requirement is met through the use of mailpiece blocks. The second is met using an algorithm that determines which parts of the meter history need to be recalculated. These features will be described in the following sections.

Assignment of Mailpieces to Mailpiece Blocks

For the purpose of balancing meters, OMS 100 does not necessarily need to examine each and every mailpiece. What it does need to know is that all postage used has been accounted for, which means that every change in meter registers can be associated with mailpiece data received from control system 14. Once OMS 100 knows this to be the case for some range of meter register values, it can consider only the start and end of the range, and not look at each mailpiece in between. This leads to the concept of a mailpiece block.

The first time a mailpiece is received from a meter, OMS 100 computes the values of all of the meter's registers before that piece was processed. (This will typically be computed because the control system 14, according to the convention established, reports the meter register values after processing the piece, so the current postage must be subtracted/added to find the initial register values.) These three values, one each for the ascending, descending, and piececount registers, constitute the start of a block. OMS 100 assigns a block ID to this block (an integer which increments for each block in the database), and all mailpieces that are part of this block, which at this point includes only this first one, will be assigned this unique block ID in the OMS 100 database. If B is used to represent the block ID, and $mp\_start\_asc_n$, $mp\_start\_desc_n$, and $mp\_start\_count_n$ represent the start ascending, descending, and piececount registers, respectively, of received mailpiece n, then the starting register values for block B may be represented as $start\_asc_B = mp\_start\_asc_1$, $start\_desc_B = mp\_start\_desc_1$, and $start\_count_B = mp\_start\_count_1$.

When data for this first mailpiece in the block are received, OMS 100 also has the values of the meter's registers after the piece was processed, since these are directly provided in the incoming data. Call these $mp\_end\_asc_1$, $mp\_end\_desc_1$, and $mp\_end\_count_1$. When the next mailpiece is received, OMS 100 computes the values of the meter registers before that piece was processed, which may be referred to as $mp\_start\_asc_2$, $mp\_start\_desc_2$, and $mp\_start\_count_2$. If $mp\_end\_asc_1 = mp\_start\_asc_2$ and $mp\_end\_desc_1 = mp\_start\_desc_2$ and $mp\_end\_count_1 = mp\_start\_count_2$, then the second mailpiece is considered to be part of the same block as the first mailpiece, and is assigned the same block ID.

This test continues for subsequent mailpieces, and as long as $mp\_end\_asc_n = mp\_start\_asc_{n+1}$ and $mp\_end\_desc_n = mp\_start\_desc_{n+1}$ and $mp\_end\_count_n = mp\_start\_count_{n+1}$, then mailpiece n+1 is assigned the same block ID as piece n. When one of the initial register values for a piece n+1 does not match the final values for piece n, then n's block is ended and a new block ID, B+1, is assigned to piece n+1. In this case, the end of block B, the last mailpiece in which is mailpiece n, is $end\_asc_B = mp\_end\_asc_n$, $end\_desc_B = mp\_end\_desc_n$, and $end\_count_B = mp\_end\_count_n$.

The comparisons of meter register values and the resulting block ID assignments described above occur in real-time as mailpiece data are received from control system 14. When a balancing operation is executed, OMS 100 can retrieve the start and ending register values of each block from its database, and work with these instead of individual mailpieces, since it has already analyzed each block for continuity of register values.

In addition to the starting and ending register values, blocks also have postage, funds, and pieces attributes, defined as follows for block B:

$postage_B$=$end\_asc_B$−$start\_asc_B$ $funds_B$=$end\_desc_B$−$start\_desc_B$ $pieces_B$=$end\_count_B$−$start\_count_B$ For blocks composed, as described above, of multiple, contiguous mailpieces, the change in the ascending register must always equal the change in the descending register, but in the opposite direction. So, postage=−funds. However, blocks may be used for other types of transactions besides those representing sequences of mailpieces. When, for example, funds are added to a meter, a block can be created by OMS 100 for which start_asc=end_asc, start_count=end_count, and end_desc=start_desc+F, where F is the amount of funds added. All of the corrections added by OMS 100 to balance the meters are in the form of mailpiece blocks, with initial and final register values and values for postage,funds, and pieces. In the case of funds-add transactions, postage will be zero (because the ascending register did not change), and funds will be the amount of the funds change.

In addition to reducing the volume of data that must be processed for balancing, the use of mailpiece blocks has another benefit as well, which is that if the control system 14 itself supplies data in block format (which essentially means it provides starting and ending values for each meter register), then OMS 100 can perform balancing operations on these data as well as mailpiece-level data. This feature may be used in low-end postage accounting systems, where the control system 14, instead of reporting on each mailpiece, reads meter registers and the beginning and end of a run and assigns all of the postage used to a specified account. The automatic balancing feature is still useful here in making sure funds are not unaccounted for between runs.

Figure 3:
FIG. 3 is an exemplary representation of a mail piece block in accordance with the present invention.

In the descriptions of automatic balancing operations that follow, it is useful to represent mailpiece blocks in the OMS 100 database in the manner shown in FIG. 3. FIG. 3 depicts a mail piece block 3B in accordance with the present invention. (To simplify the figures, postage, funds, and pieces may sometimes be omitted, since they can be derived from the other values).

Figure 4:
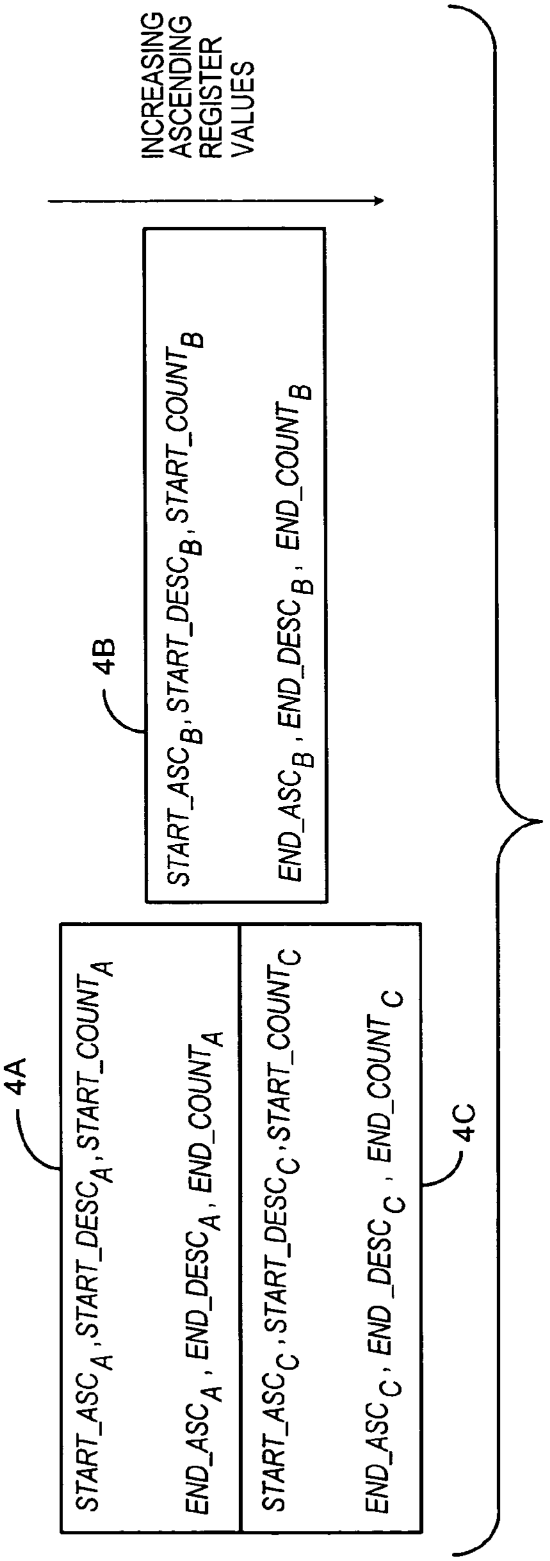
FIG. 4 represents an example of overlapping mail piece blocks in accordance with the present invention.

In figures with multiple blocks, the lowest ascending register values will appear at the top of the page, with values increasing down the page. Two blocks with no gap in between (where $end\_asc_B$=$start\_asc_{B+1}$, etc.) will appear as depicted in FIG. 4, blocks 4A and 4C. If blocks overlap, the overlapping blocks are shown side-by-side, as depicted by block 4B.

Figure 5:
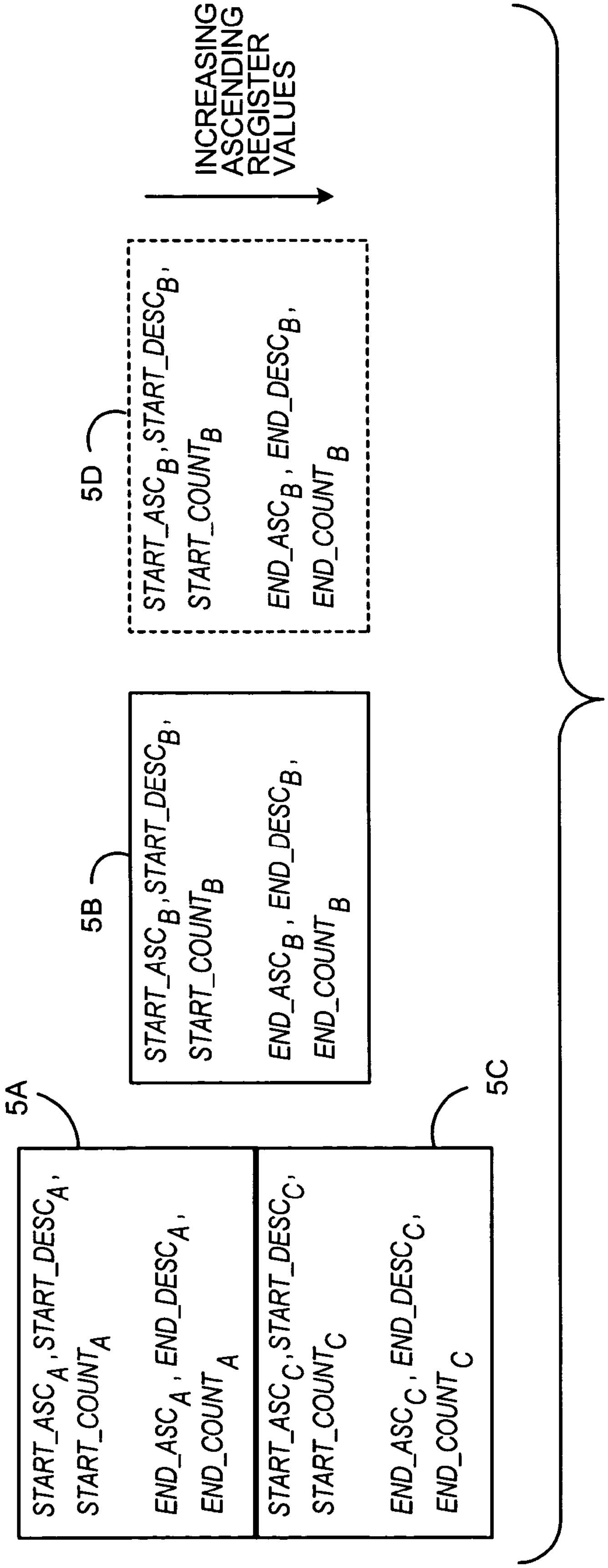
FIG. 5 depicts an exemplary use of a negative mail piece block.

FIG. 4 shows three blocks, where block 4B overlaps parts of blocks 4A and 4C, because $start\_asc_B > start\_asc_A$, $start\_asc_B < end\_asc_A$, $end\_asc_B > start\_asc_C$, and $end\_asc_B < end\_asc_C$. In this situation, OMS 100 needs to add a negative block (negative postage used) to cancel the overlapping block. Negative blocks are shown dashed blocks, as shown in FIG. 5, block 5D.

In a "negative" block 5D, start_asc is still less than end_asc, just as for a normal block. However, the computations of postage, funds, and pieces are reversed:

postage=start_asc−end_asc funds=start_desc−end_desc pieces=start_piececount−end_piececount These computations are reversed so that when all of the postage, funds, or pieces values are added together, the negative blocks will cancel out overlapping blocks, and the sum will match the overall totals:

$end\_asc_Z$−$start\_asc_1$=Sum(1 . . . Z) postage $end\_desc_Z$−$start\_desc_1$=Sum(1 . . . Z) funds $end\_count_Z$−$start\_count_1$=Sum(1 . . . Z) pieces So, after balancing by OMS 100, the above overlap condition would be resolved by OMS 100 adding a negative block 5D.

Determining Balancing Start and Endpoints

As described above, in order to provide acceptable performance and respond quickly to the presence of new data, OMS 100 needs to be able to perform balancing operations on only those parts of the meter history that have been updated, not on all of a meter's history at once.

Figure 6:
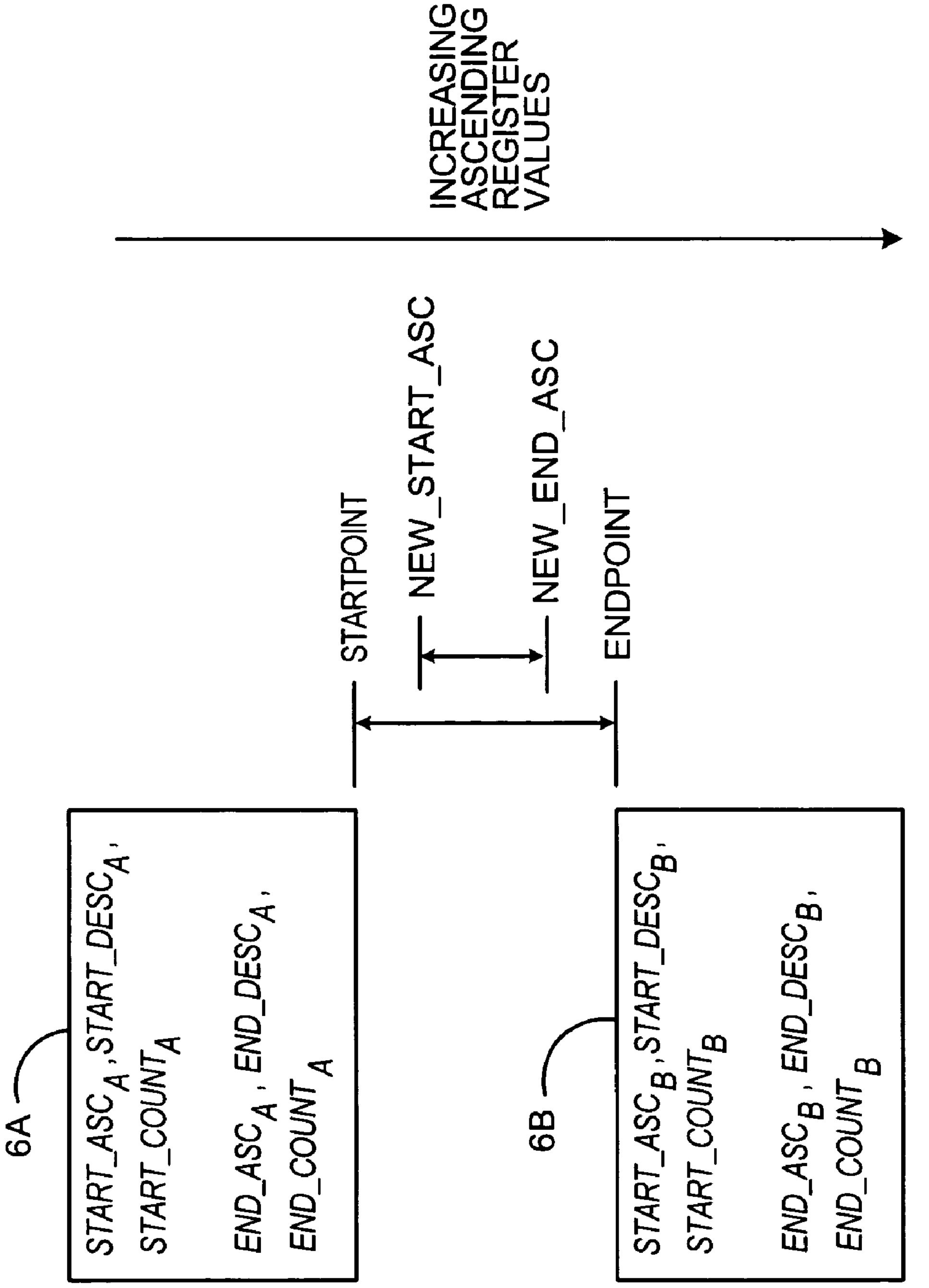
FIG. 6 depicts an exemplary gap to be analyzed between mail piece blocks.

The balancing process begins by obtaining a list of blocks, sorting them into increasing ascending register order (and ordering by other register values if the ascending registers are equal for two blocks), and then reading through the list to look for gaps. So, in order to do an update of a section of the meter history, the problem becomes one of determining how to select the blocks to examine, given that some alteration was made to the meter history beginning at new_start_asc and ending at new_end_asc, as shown in FIG. 6. (New data may not necessarily be contiguous over this interval). This is done as follows:

First, in the preferred embodiment, the assumption is made that the meter history was initially in a balanced state before the addition of new data. Since balancing operations are sequential, this is a reasonable assumption: each balancing operation occurs on a meter history that was already balanced by the previous operation, and would be balanced still except for the addition of data between the two endpoints.

Second, an algorithm is used to determine the start and endpoints of the section to examine, based on new_start_asc, new_end_asc, and the neighboring blocks 6A and 6B. Then, any correction blocks generated earlier that fall between the chosen start and endpoints are deleted, to prevent the balancing code from being confused by its own corrections. The only correction blocks that are not deleted are discrepancy blocks (blocks added to fill a gap) which a user has marked as valid, meaning that no additional data are expected to fill in the gap. This allows the user to assign permanent account information to these blocks without them being recycled in future balancing operations.

In FIG. 6, new data have been received which fill a gap between two existing blocks 6A and 6B. Blocks 6A and 6B must be included in the list of blocks evaluated for this balancing operation, so that the spaces between the end of block 6A and new_start_asc and between new_end_asc and block 6B are considered. OMS 100 does this by finding:

The startpoint=Maximum(end_asc) where end_asc<new_start_asc.

The endpoint=Minimum(start_asc) where start_asc>new_end_asc.

This will find blocks 6A and 6B in the example above, and the range to consider for balancing will be from startpoint=$end\_asc_A$ to endpoint=$start\_asc_B$. When OMS 100 selects blocks to examine for balancing, it will include those for which:

end_asc>=startpoint and start_asc<=endpoint

Since startpoint=$end\_asc_A$ and endpoint=$start\_asc_B$, the resulting list will include blocks 6A and 6B.

Figure 7:
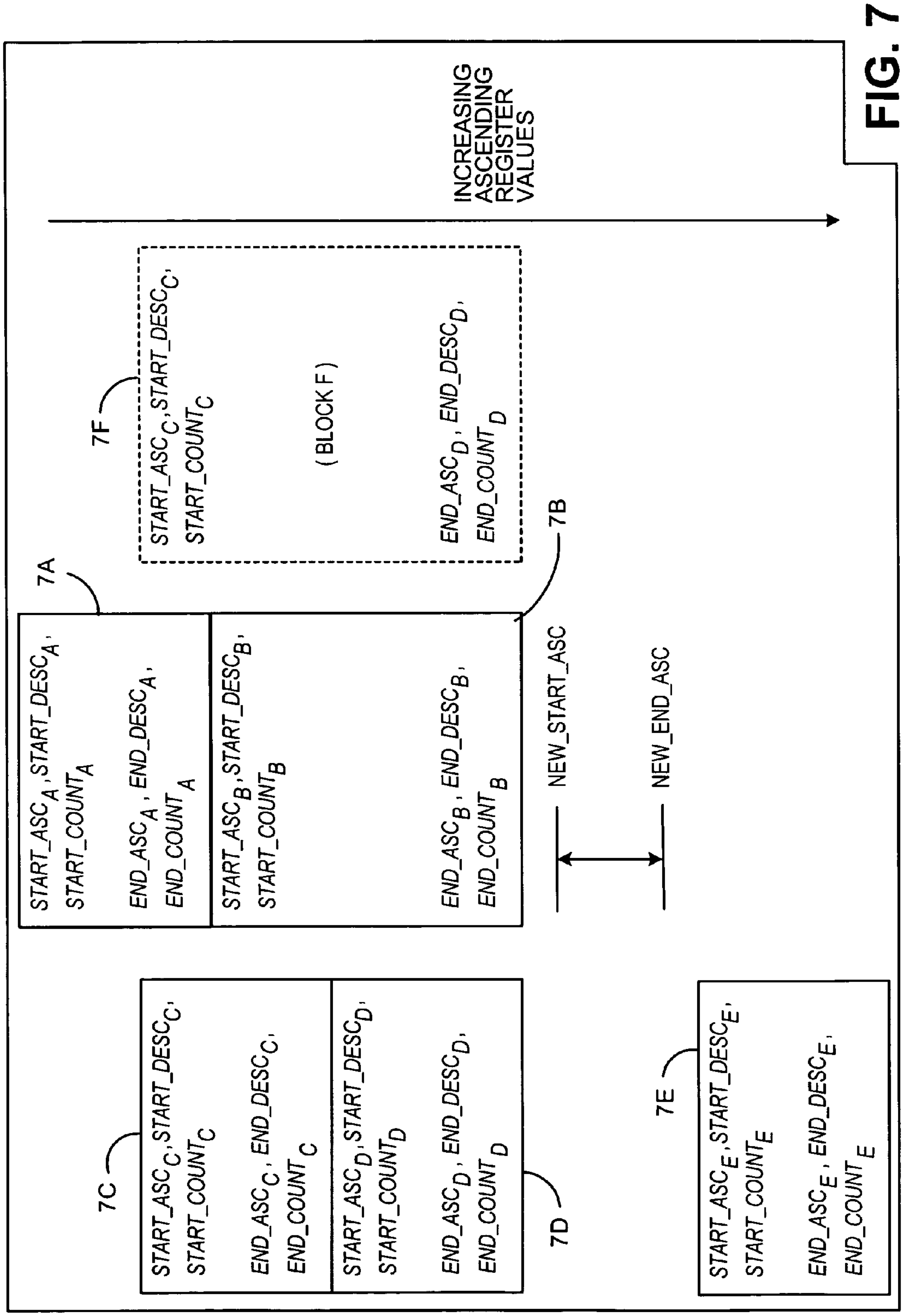
FIG. 7 is another exemplary gap to be analyzed between mail piece blocks.

This preferred simple approach does not work in all cases, however. Consider the situation depicted in FIG. 7.

Here, there is some overlap between blocks 7A, 7B, 7C, and 7D, for which OMS 100 earlier compensated by adding the negative block 7F, as shown. New data have been supplied between 7D and 7E. Using the same logic as described above, startpoint=$end\_asc_D$(same as $end\_asc_B$) and endpoint=$start\_asc_E$. The blocks selected for balancing will therefore be those for which end_asc>=startpoint and start_asc<=endpoint. This will include blocks 7B, 7D, 7F, and 7E.

This list is problematic for a few reasons: first, the first block in order by start_asc is the negative block 7F. This will make no sense to the balancing code without seeing block 7C, which was not selected. Second, even if some adjustment is made to the algorithm so that block 7C is considered, the system will not know why the negative block needs to start at $start\_asc_C$ unless it sees block 7A, since it is the overlap between 7A and 7C that the first part of the negative block is canceling out.

To prevent these and other errors that may result from complex block configurations, each prospective start and endpoint preferably meets two conditions. First, the start or endpoint should not occur inside another block. That is, for start points, there must be no block N such that $start\_asc_N$<startpoint and $end\_asc_N$>startpoint. For end points, there must be no block N such that $start\_asc_N$<endpoint and $end\_asc_N$>endpoint. Second, only one block should end at the start point or start at the end point. In combination with the above rule, this block will never be a negative block. (It can't be a negative block, because there is no block for it to cancel out: there is no other block ending (or starting) at the same point, by the second rule, and there is no block that includes this point, by the first rule.)

The above tests ensure that the first and last blocks considered by the balancing algorithm are non-negative blocks and no overlap will occur between the first block and the second or between the next-to-last and the last. The two rules are evaluated iteratively until a start or endpoint is found that meets both conditions, as shown in the flowchart of FIGS. 8A and 8B, for finding the start point and endpoint.

Figure 8A:
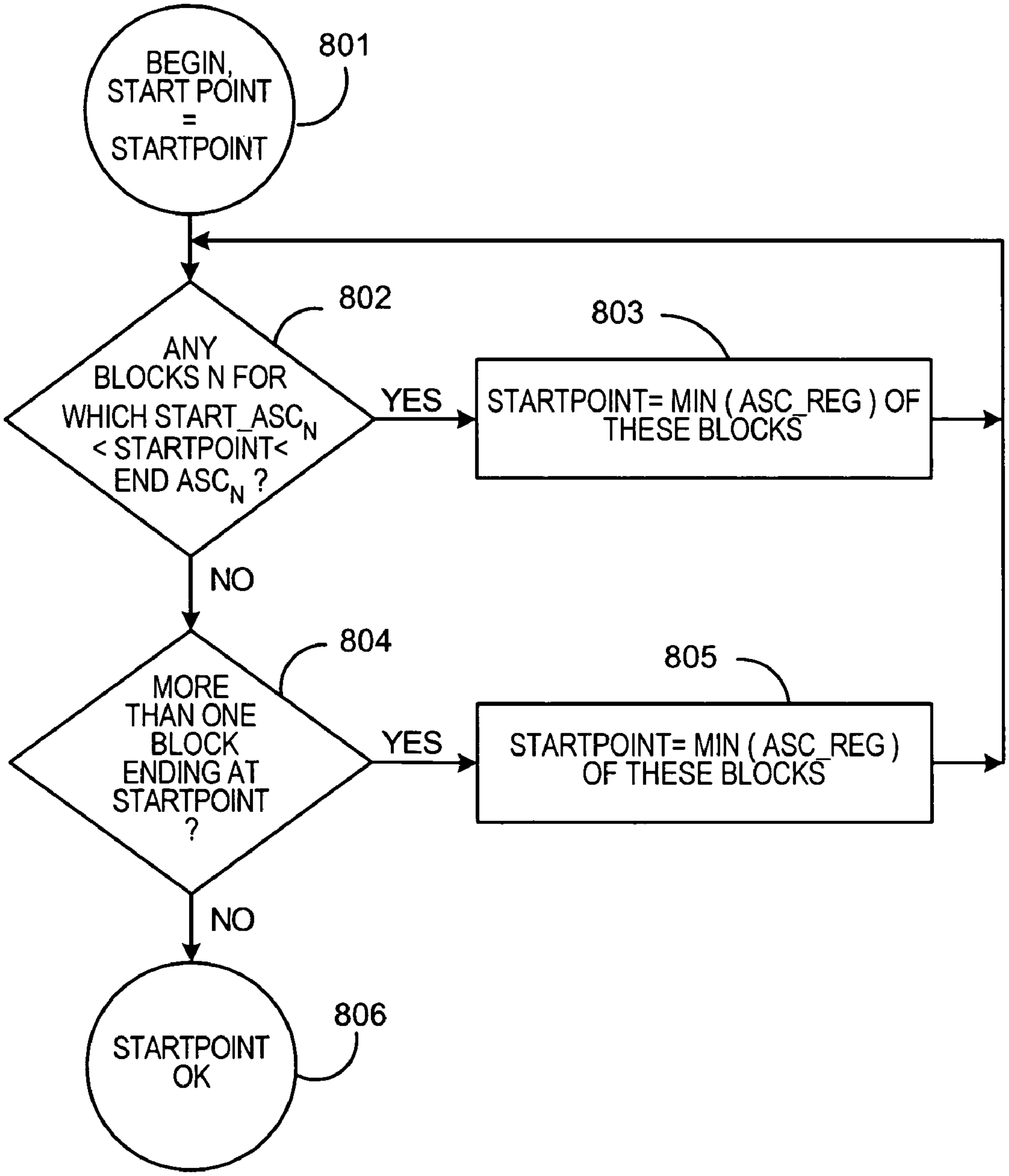
FIG. 8A and 8B are flow charts of steps for choosing the boundaries of data to be balanced in accordance with the present invention.

For validating the start point as shown in FIG. 8A, in the initial step 801, an preliminary startpoint is selected as discussed in relation to FIG. 6. In step 802, it is determined whether there are any blocks for which the startpoint occurs within the block. If the answer is YES to that determination, then at step 803 the startpoint is adjusted to be the smallest ascending register value among the blocks in which the previous startpoint fell.

At step 804, the second test to determine if more than one block ends at the startpoint is applied. If there is more than one block, then the startpoint is adjusted to be the smallest ascending register value for the group of blocks that ended at that point (step 805). If both of theses tests are passed, then the startpoint is validated (step 806).

Figure 8B:
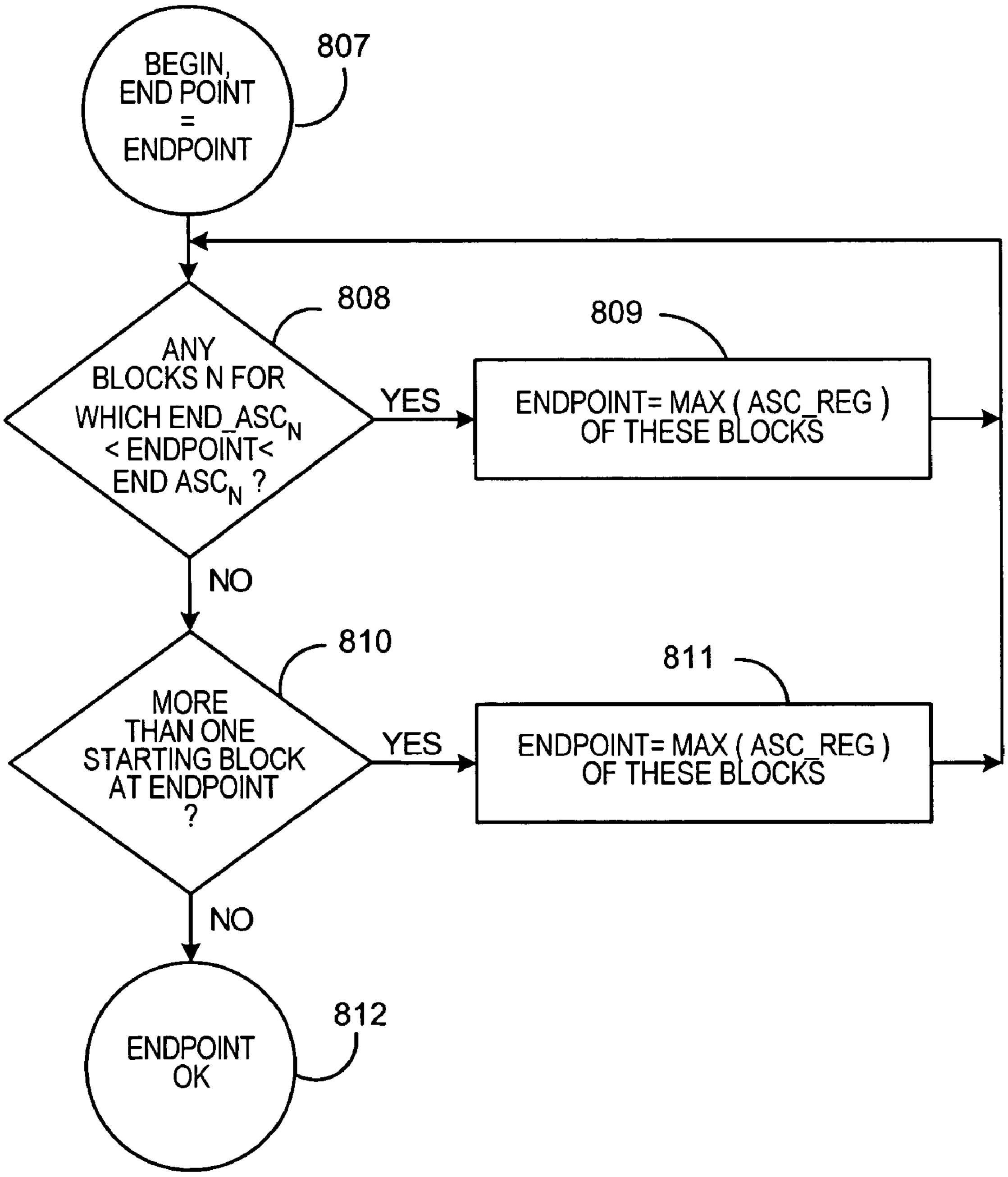

Similarly, for validating the end point as shown in FIG. 8*b*, in the initial step 807, an preliminary endpoint is selected as discussed in relation to FIG. 6. In step 808, it is determined whether there are any blocks for which the endpoint occurs within the block. If the answer is YES to that determination, then at step 809 the endpoint is adjusted to be the largest ascending register value among the blocks in which the previous endpoint fell.

At step 810, the second test to determine if more than one block starts at the endpoint is applied. If there is more than one block, then the endpoint is adjusted to be the largest ascending register value for the group of blocks that started at that point (step 811). If both of theses tests are passed, then the endpoint is validated (step 812).

Figure 9A:
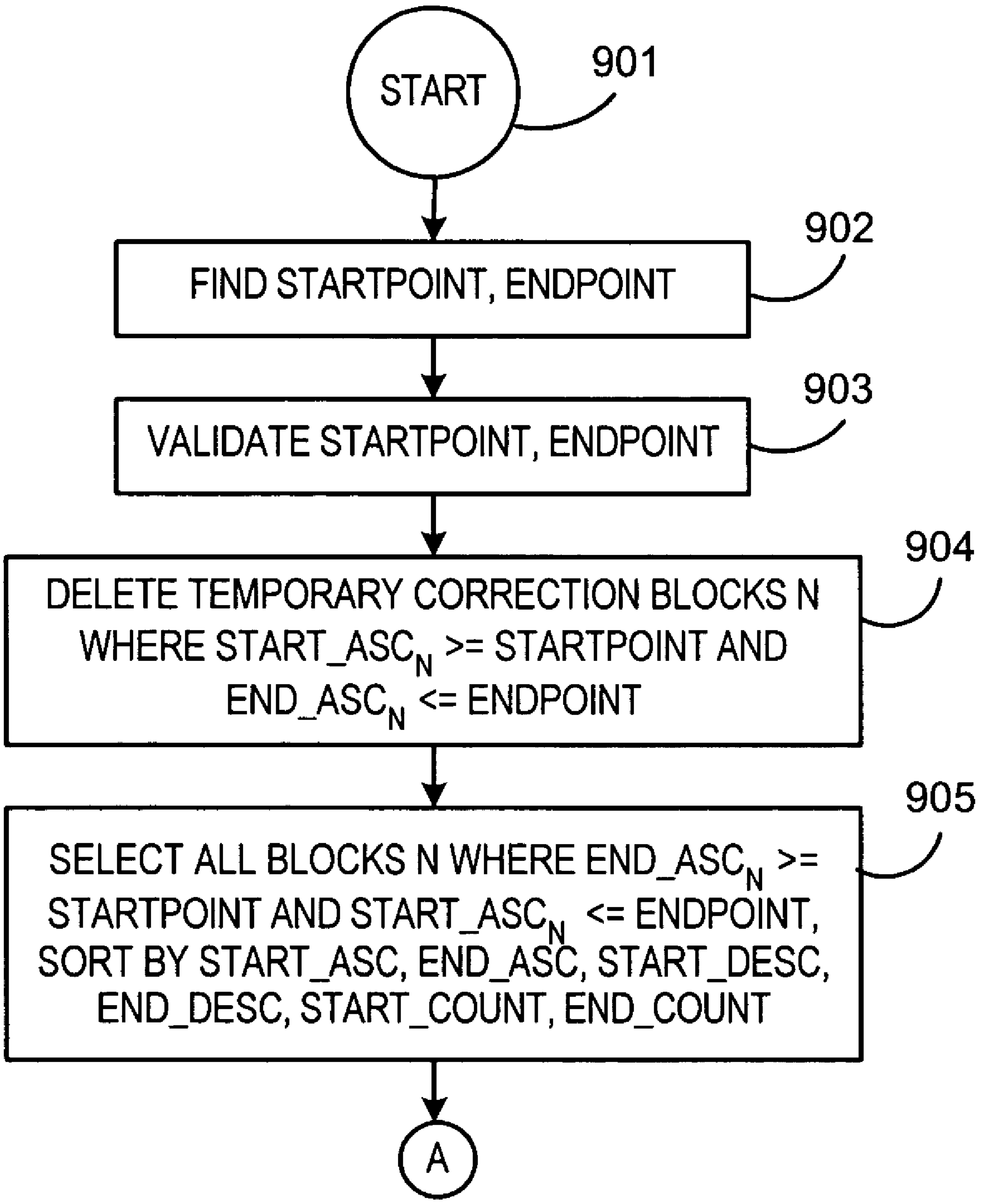
FIGS. 9A and 9B are a flow chart including preferred steps for carrying out balancing in accordance with the present invention.
Figure 9B:
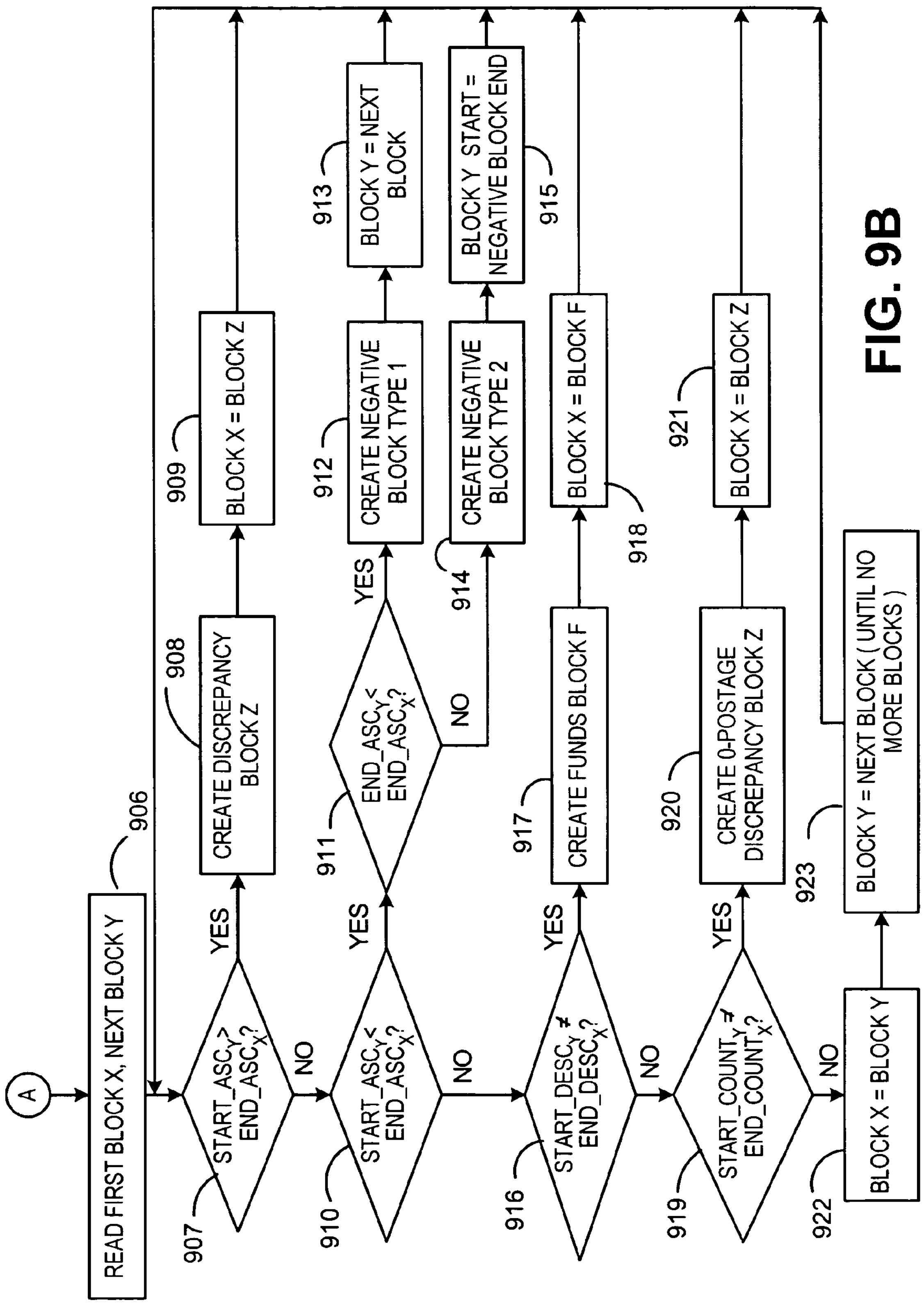

Referring now to FIGS. 9A and 9B, the balancing process takes as input the smallest ascending register value for which new data were received (new_start_asc) and the largest ascending register value for which new data were received (new_end_asc), and follows the logic shown in the flowcharts of FIGS. 9A and 9B to add corrections as required.

In addition to adding correction blocks, another important function of the balancing procedure is to assign these correction blocks to appropriate accounts, machines, operators, and other attributes. When the system detects, for example, that postage has been used without mailpiece data being received for it, the system must still assign this postage to some account, or postage reports by account will show a smaller total than the sum of all funds used. If negative blocks are added to correct for duplicated or erroneous data, an amount must be subtracted from some account in order to keep reports by account in balance. The same goes for other fields by which reports can be generated, including: account, carrier/class, machine, mailrun, and operator.

OMS 100 cannot know which account should be charged when all it knows is that funds were spent, but it can make an estimation based on what was taking place prior to the discrepancy. Likewise, it may not know in all cases how to assign negative blocks so that the totals for all reports are accurate, but it will take reasonable action based on the data that are available. Details on how this assignment is done for various types of corrections is described below for each correction type.

Balancing Algorithm

The flowchart of FIGS. 9A and 9B shows the overall logic behind the preferred embodiment for OMS 100 automatic balancing. In steps 902 and 903 the startpoint and endpoint are determined and validated in accordance with the discussion above, and as depicted in FIGS. 6, 8A and 8B. In step 904, previous correction records within the range to balance are deleted, and preferably, at step 905, a sorted list of blocks that border the validated startpoint and endpoint is generated from the OMS 100 database.

Turning to FIG. 9B, the balancing logic involves comparing two blocks, shown at step 906 as X and Y, which are initially the first two blocks in the list. Ideally, $end\_asc_X$=$start\_asc_Y$, $end\_desc_X$=$start\_desc_Y$, and $end\_count_X$=$start\_count_Y$. If any of these expressions is not true, some kind of correction record needs to be added, in accordance with the steps of FIG. 9B. Following this, blocks X and Y will refer to some other pair of blocks for comparison in subsequent iterations. In some cases, as shown, the newly-created correction becomes the new "block X", and its ending register values will be compared to the same "block Y" as on the previous iteration. In the case of the first type of negative block, block X remains as on the previous iteration, and block Y becomes the next block in the list.

Specifically, at step 907 it is determined whether the start of the ascending register for block Y is greater than the end of block X. If the answer is YES then there is a gap, and a discrepancy block Z is created in step 908. At step 909, block Z is assigned to be the new block X and the next iteration is started.

At step 910, it is determined whether the start of the ascending register for block Y is before the end of block X. In such a case, then block Y overlaps with the preceding block X. At step 911, the extent of overlap is determined by checking whether the end of block Y is before the end of block X. If block Y is complete within block X, then a negative block type 1 (described below) is applied at step 912. Before beginning the next iteration, at step 913 block Y is redefined to be the next consecutive block on the list. If block Y only partially overlaps block X, then a negative block type 2 is created at step 914. In that case, before beginning the next iteration, the start of block Y is defined to be the end of the negative block that was applied.

The balancing algorithm moves on from ascending register balancing of postage spent, to balancing of postage funds, i.e. the descending register. At step 916, if the descending register value for the start of block Y is not equal to the end of the descending register for block X, then a fund discrepancy has occurred. Accordingly, at step 917, a funds block F is created to correct this problem. For the next iteration, the new block F is assigned to be the new block X (step 918).

At step 919, the piece counts are compared to determine whether the start count of block Y is the same as the start count of block X. If not, then a zero-postage discrepancy block Z is created (step 920). For the subsequent iteration, block Z becomes block X.

Finally, at steps 922 and 923, all of the balancing tests have been passed for the selected blocks X and Y. At step 922, current block X becomes the new block Y for the next iteration, and a new block Y is selected from the next block (until there are no more blocks).

Discrepancy Blocks

Figure 10:
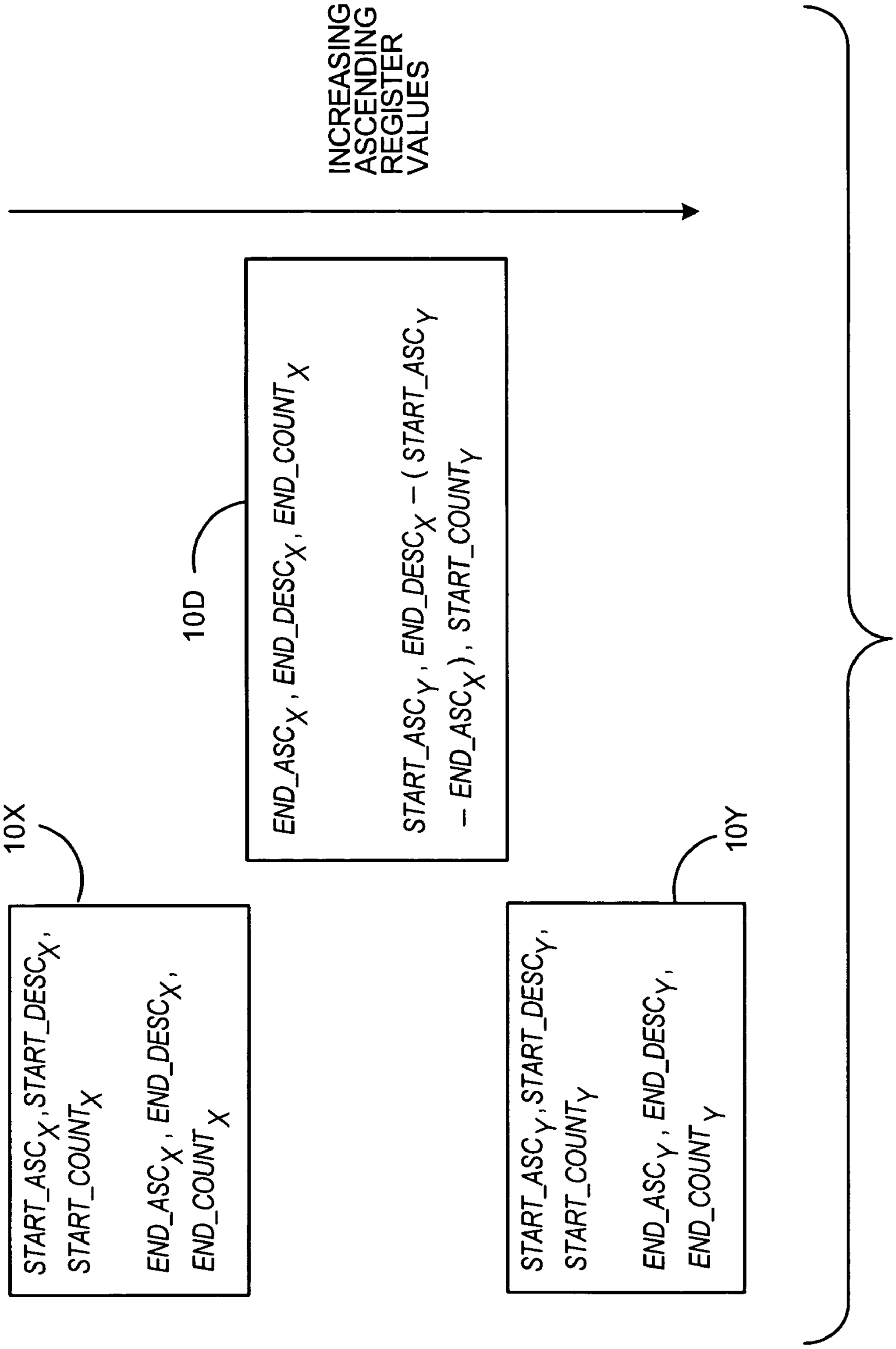
FIG. 10 depicts an exemplary discrepancy block in accordance with the present invention.

A "discrepancy" refers to a situation in which mailpieces were metered with or without postage but data on these pieces were not reported to OMS 100. In FIG. 10, a discrepancy record is shown being added between blocks 10X and 10Y.

The account, carrier/class, machine, mailrun, and operator for the discrepancy block will be taken from block 10X, so the system is essentially assuming the last-used account, machine, etc. were used for the missing mailpieces. Note that the end descending register value in the discrepancy block is not necessarily the same as the start descending register of the following block. The value is instead preferably computed as:

$$\text{end\_desc}_{discrepancy}=\text{end\_desc}_X-(\text{start\_asc}_Y-\text{end\_asc}_X)$$

This guarantees that the change in ascending & descending registers is the same within the discrepancy block added. It's possible that funds were also added to the meter during this interval, so a funds records may also be required in addition to a discrepancy record. This will be added on the next iteration, when the end ascending register of the discrepancy block must match the start of "block 10Y", and so the descending register values will be compared.

Negative Block Type 1

Figure 11:
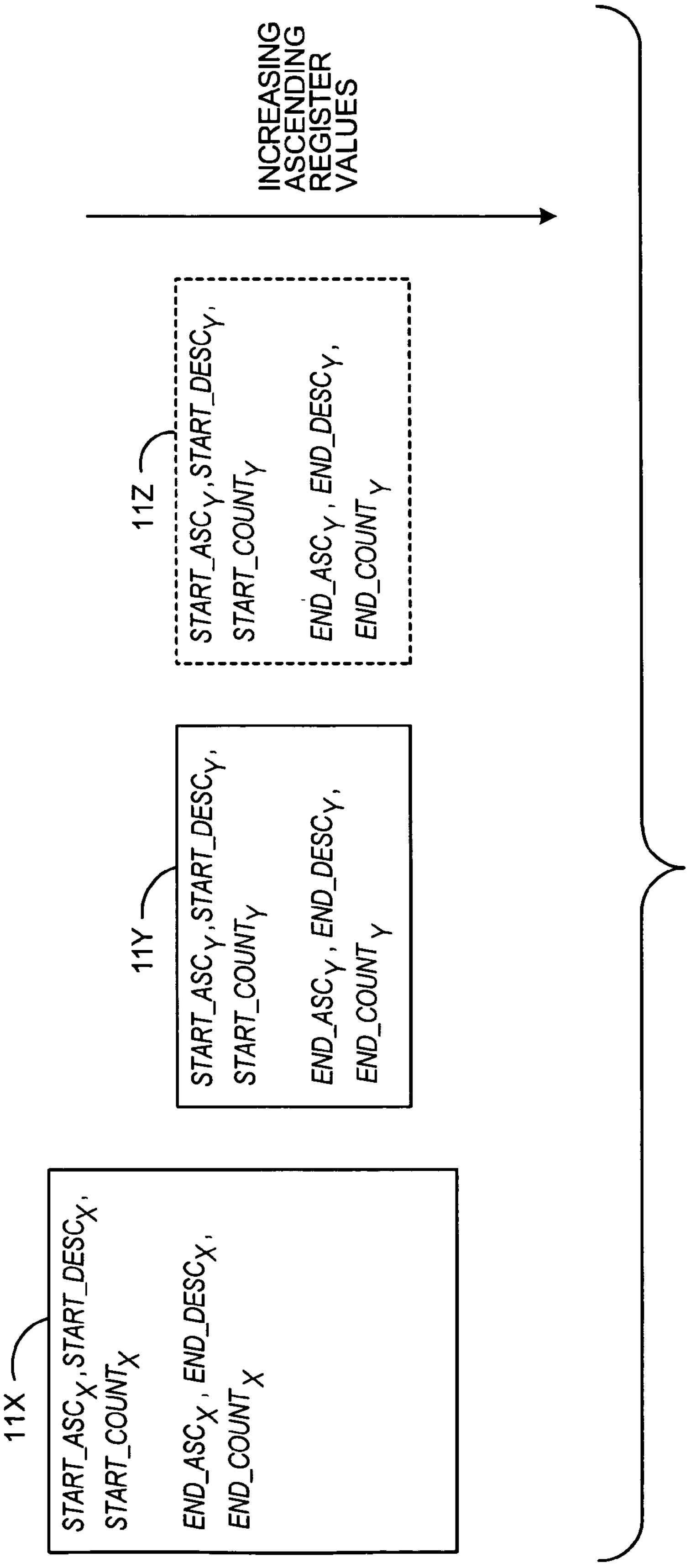
FIG. 11 depicts a further exemplary first type of negative mail piece block.

A first exemplary type of overlap condition is shown in FIG. 11. Here, block 11Y is a duplication of a subset of block 11X. In this case, OMS 100 adds a correction to negate block 11Y, then evaluates block 11X against the next block in the list:

The account, carrier/class, machine, mailrun, and operator that appear in the negative block will be taken from block 11X, unless block 11X is itself a correction block, such as a discrepancy, which was at some time made "permanent" by a user (and so was not deleted prior to balancing). In this case, the information in block 11Y is given precedence, because it may be based on actual mailpiece data.

Negative Block Type 2

Figure 12:
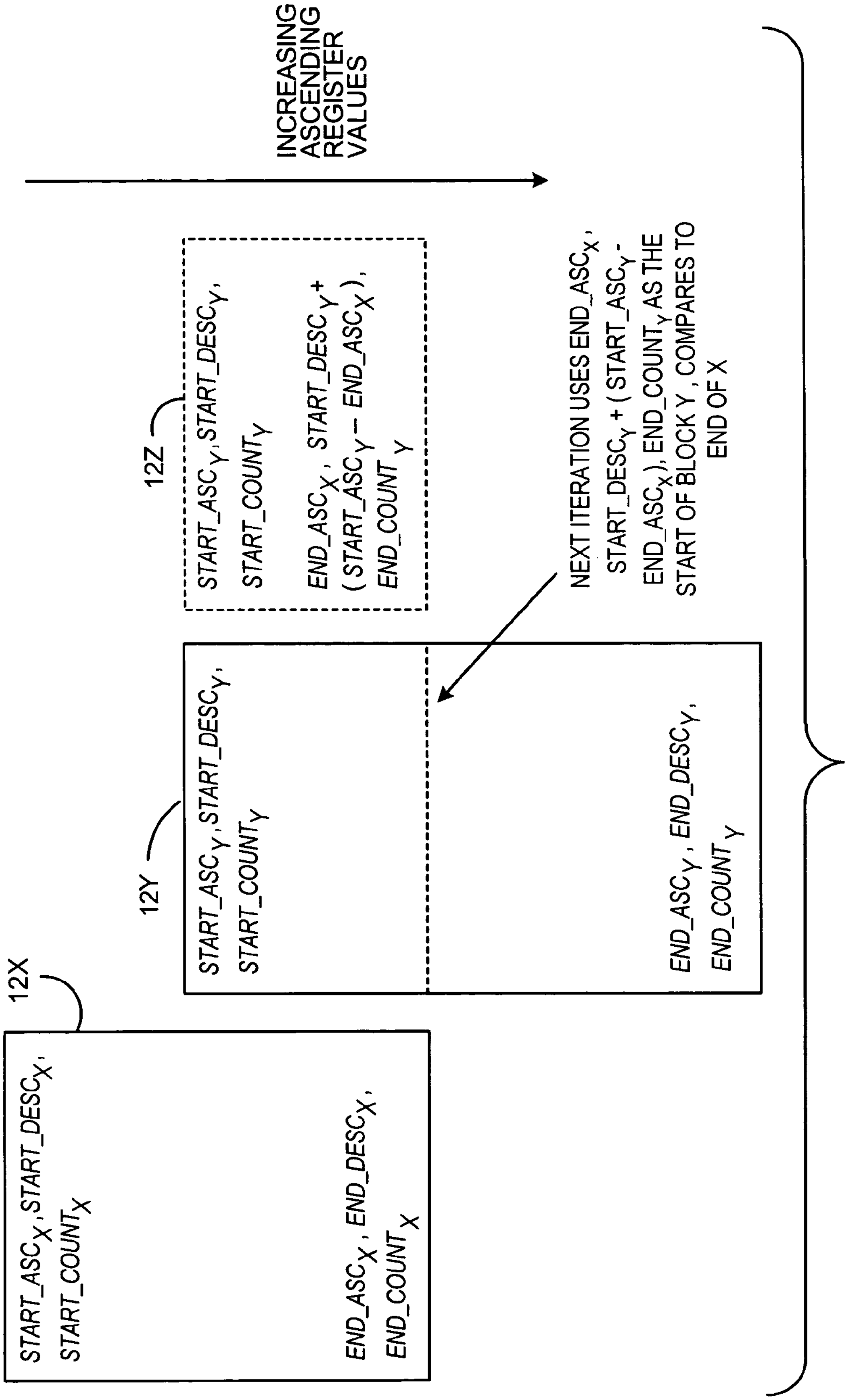
FIG. 12 depicts a further exemplary second type of negative mail piece block.

A second exemplary type of overlap condition is shown in FIG. 12. Here, block 12Y begins before block 12X ends, but continues at least as far as 12X, or beyond, as shown in the figure. In this case, a negative block is added which cancels that part of 12X and 12Y that overlap, then this new block becomes the new X. On the next iteration, the end of block 12X, unchanged, is compared to the part of 12Y that did not overlap, as determined by using the end of the negative block as the start of the remainder of block 12Y.

As for the other overlap block condition, the account, carrier/class, machine, mailrun, and operator information for the negative block comes from block 12X, unless block 12X did not result from actual mailpiece data, in which case it comes from block 12Y.

Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for automatic balancing of mail processing postage fund accounts for an inserter system, the method comprising:

forming mail pieces on an inserter machine, the inserter machine comprising a postage meter for printing postage value on the mail pieces;

gathering register information from the postage meter while forming mail pieces, the register information including an ascending register of postage funds printed by the postage meter, a descending register of postage funds available for printing by the postage meter, and a piece count;

defining mail piece blocks based on gathered register information, the step of defining including assigning individual mail pieces to mail piece blocks using the following steps:

(a) receiving register information indicating register status after a particular mail piece is processed;

(b) comparing the register information for the particular mail piece to determine a difference in register values from the register information of a prior mail piece;

(c) if the difference is consistent with processing of a single mail piece, then assigning the particular mail piece to a same mail piece block as the prior mail piece, and if the difference is not consistent with processing of a single mail piece, then assigning the particular mail piece to a new mail piece block;

identifying gaps between defined mail piece blocks and mail pieces within the gaps; and accounting for the mail pieces within the gaps in accordance with a predetermined algorithm, the step of accounting further including examining a subset of mail piece blocks proximal to the identified gaps.

2. The method of claim 1 wherein the step of accounting for the mail pieces within the gaps includes applying account information to the mail pieces within the gaps corresponding to account information from a previous block.

3. The method of claim 1 further including a step of gathering postage meter print value setting information while forming mail pieces and wherein the step of comparing the register information for the particular mail piece further comprises:

(d) based on ending ascending or descending register information and the postage meter print value setting information for the mail pieces, calculating beginning ascending or descending register information for the particular mail piece before processing and comparing the beginning ascending or descending register information for the particular mail piece with the ending ascending or descending register information of the immediately prior mail piece to determine if the difference is consistent with processing of a single mail piece.

4. The method of claim 1 wherein the step of comparing the register information for the particular mail piece further comprises comparing a piece count for the particular mail piece with the piece count for the prior mail piece, and assigning the particular mail piece to a same mail piece block as the prior mail piece if there is an interval of one mail piece, and otherwise assigning the particular mail piece to a new mail piece block.

5. The method of claim 1 further including a step of determining if mail piece blocks include overlapping mail piece information and eliminating duplicate data so that the same information is only accounted for once.

6. The method of claim 5 wherein the step of eliminating duplicate data includes defining a negative block corresponding to the overlapping mail piece information.

7. The method of claim 1 wherein the step of accounting further includes a step of defining a startpoint for performing balancing and an endpoint for performing balancing and whereby the startpoint and the endpoint encompass an identified gap and mail piece blocks bordering on the identified gap and whereby the step of accounting considers a range between the defined startpoint and endpoint, including mail piece blocks and the identified gap, for the purposes of the predetermined algorithm.

8. The method of claim 7 wherein the startpoint and endpoint are determined so that neither the startpoint nor the endpoint occur inside a mailpiece block, and whereby only one block ends at the startpoint and only one block starts at the endpoint.

9. The method of claim 1 wherein the step of identifying gaps includes sorting mail piece blocks in consecutive order to find gaps.

10. The method of claim 9 wherein the step of accounting includes creating a discrepancy block to fill an identified gap where a starting ascending register value of a second block is greater than a starting ascending register value of a preceding first block.

11. The method of claim 10 wherein the step of accounting includes creating a negative block to cancel an overlap when the starting ascending register value of the second block is less than the starting ascending register value of the first block.

12. The method of claim 11 wherein the step of accounting includes creating a funds block to balance a difference between a starting descending register value of the second block and an ending descending register value of the first block.

13. The method of claim 12 wherein the step of accounting includes creating a zero postage discrepancy block to balance a difference between a starting piece count register value for the second block and an ending piece count register value for the first block.

14. The method of claim 13 wherein the step of accounting further includes a step of defining a startpoint for performing balancing and an endpoint for performing balancing and whereby the startpoint and the endpoint encompass an identified gap and mail piece blocks bordering on the identified gap and whereby the step of accounting considers a range between the defined startpoint and endpoint, including mail piece blocks and the identified gap, for the purposes of the predetermined algorithm.

15. The method of claim 14 wherein the startpoint and endpoint are determined so that neither the startpoint nor the endpoint occur inside a mailpiece block, and whereby only one block ends at the startpoint and only one block starts at the endpoint.

16. The method of claim 15 whereby the accounting steps are iterated for all blocks at or between the defined startpoint and endpoint.

* * * * *